United States Patent
Nemeth et al.

(10) Patent No.: US 9,555,948 B2
(45) Date of Patent: Jan. 31, 2017

(54) DOUBLE-WALLED, VACUUM-INSULATED CONTAINER HAVING INNER COATING CURED AT HIGH TEMPERATURE

(71) Applicant: RUBBERMAID INCORPORATED, Huntersville, NC (US)

(72) Inventors: Christopher P. Nemeth, Atlanta, GA (US); Gunnar B. Olson, Smyrna, GA (US); Brandon L. Stroud, Smyrna, GA (US); Sichong Xia, Atlanta, GA (US)

(73) Assignee: RUBBERMAID INCORPORATED, Huntersville, NC (US)

( * ) Notice: Subject to any disclaimer, the term of this patent is extended or adjusted under 35 U.S.C. 154(b) by 184 days.

(21) Appl. No.: 14/100,594

(22) Filed: Dec. 9, 2013

(65) Prior Publication Data
US 2015/0158657 A1 Jun. 11, 2015

(51) Int. Cl.
B65D 81/38 (2006.01)
A47J 41/02 (2006.01)
B23K 31/02 (2006.01)

(52) U.S. Cl.
CPC .......... *B65D 81/3841* (2013.01); *A47J 41/028* (2013.01); *B23K 31/02* (2013.01); *Y10T 29/49888* (2015.01)

(58) Field of Classification Search
CPC ................................................. B65D 81/3841
USPC ......... 220/592.27, 592.2; 29/455.1; 264/643, 264/131, 129, 209.6, 602
See application file for complete search history.

(56) References Cited

U.S. PATENT DOCUMENTS

| | | | |
|---|---|---|---|
| 872,795 | A | 12/1907 | Burger |
| 1,165,952 | A | 12/1915 | Dunlap |
| 1,199,772 | A | 10/1916 | Engel |
| 1,551,778 | A | 9/1925 | Altenberg |

(Continued)

FOREIGN PATENT DOCUMENTS

| | | |
|---|---|---|
| CN | 2873017 Y | 2/2007 |
| CN | 202208422 U | 5/2012 |

(Continued)

OTHER PUBLICATIONS

"12 oz. Autoseal Kids Scout Stainless Bottle," Obtained from http://www.gocontigo.com/12-oz-autoseal-kids-scout-stainless-bottle-550.html, Date retrieved Dec. 2, 2013, 2 pages.

(Continued)

*Primary Examiner* — Anthony Stashick
*Assistant Examiner* — Raven Collins
(74) *Attorney, Agent, or Firm* — Marshall, Gerstein & Borun LLP

(57) ABSTRACT

A double-walled, vacuum-insulated container is manufactured with a cured inside coating. To form the container, an inner liner is disposed in an outer body. The inner liner has an inner sidewall, an inner bottom, and an inner lip, and the outer body has an outer sidewall and an outer lip. The inner and outer lips are affixed together with an affixation or weld having a first melt point. A plenum is enclosed between the inner liner and the outer body by affixing an outer bottom to the outer body and creating a vacuum at least partially in the plenum using a seal having a second melt point. This second melt point can be about 450° C. and 500° C. The coating is painted to an inside surface of the inner liner, and the painted coating is cured with a temperature level at least below the first and second melt points.

18 Claims, 6 Drawing Sheets

(56) References Cited

U.S. PATENT DOCUMENTS

| | | | |
|---|---|---|---|
| 2,832,492 A | | 4/1958 | Bramming |
| 2,895,636 A | | 7/1959 | Martin |
| 3,813,757 A | * | 6/1974 | Bell ..................... A47J 41/024 215/12.2 |
| 4,399,919 A | * | 8/1983 | Posnansky ............ A47J 41/005 126/674 |
| 4,471,206 A | | 9/1984 | Nagai |
| 4,997,124 A | | 3/1991 | Kitabatake et al. |
| 5,153,977 A | | 10/1992 | Toida et al. |
| 5,515,995 A | | 5/1996 | Allen et al. |
| 6,206,271 B1 | | 3/2001 | Cho |
| 6,264,092 B1 | | 7/2001 | Yasuda et al. |
| 7,546,933 B2 | | 6/2009 | Pinelli |
| 8,448,810 B2 | | 5/2013 | Kelly et al. |
| 2003/0220194 A1 | * | 11/2003 | Sakatani et al. .............. 502/350 |
| 2004/0011796 A1 | * | 1/2004 | Baba ................... A47J 41/0077 220/592.2 |
| 2013/0213978 A1 | | 8/2013 | Libourel et al. |

FOREIGN PATENT DOCUMENTS

| | | |
|---|---|---|
| EP | 0109262 A1 | 5/1984 |
| EP | 0603613 B1 | 6/1994 |
| JP | 08-000338 A | 1/1996 |
| JP | H-08338 A | 1/1996 |
| JP | 2000-116541 A | 4/2000 |
| JP | 2002080075 A | 3/2002 |
| JP | 3390349 B2 | 3/2003 |

OTHER PUBLICATIONS

Leeds, "Aluminum Bottle Coating," Leedsworld.com, Date retrieved Dec. 2, 2013, 1 page.

"Zojirushi Stainless Steel Vacuum Bottle Instruction Manual," Zojirushi America Corporation, www.zojirushi.com, Date retrieved Dec. 2, 2013, 2 pages.

"Haers Genuine Hals Stainless Steel Vacuum Flask Cup Portable Sports Water Bottle with Lid Cup 600ml," Obtained from http://www.dinodirect.com/genuine-hals-stainless-steel-vacuum-flask-cup-portable-sports-water-bottle-with-lid-cup-600ml-p31594125.html, Date retrieved Dec. 2, 2013, 9 pages.

"Haers Ocean Series Stainless Steel Vacuum Cup Lovers Cup Water Bottle Thermos Bottle Sports Bottle 500ml Vacuum Flasks," Obtained from http://www.aliexpress.com/store/product/Haers-Ocean-series-stainless-steel-vacuum-cup-lovers-cup-water-bottle-thermos-bottle-Sport-Bottle-500ml/830805__1073055944.html, Date retrieved Dec. 2, 2013, 9 pages.

"Hydro Flask Insulated Stainless Steel Water Bottle—24 oz (Medium)—Narrow Mouth," Obtained from http://www.hydroflask.com/products/hydro-flask-insulated-water-bottle-24oz-medium, Date retrieved Dec. 2, 2013, 4 pages.

"Klean Kanteen Insulated: Stainless Steel Insulated Bottle and Mug," Obtained from http://www.kleankanteen.com/products/insulated/klean-kanteen-insulated.php, Date retrieved Nov. 26, 2013, 2 pages.

"Vacuum Insulated 16 oz Stainless Steel Commuter Bottle," Obtained from http://www.thermos.com/products/vacuum-insulated-16-oz-stainless-steel-commuter-bottle.aspx, Date retrieved Nov. 26, 2013, 3 pages.

"Vacuum Insulated 22 oz Hydration Bottle," Obtained from http://www.thermos.com/products/vacuum-insulated-22-oz-hydration-bottle.aspx, Date retrieved Dec. 2, 2013, 3 pages.

Examination Report, Canadian Patent Application No. 2,857,363, dated Oct. 14, 2015.

International Search Report and Written Opinion for Application No. PCT/US14/40685, dated Oct. 15, 2014.

\* cited by examiner

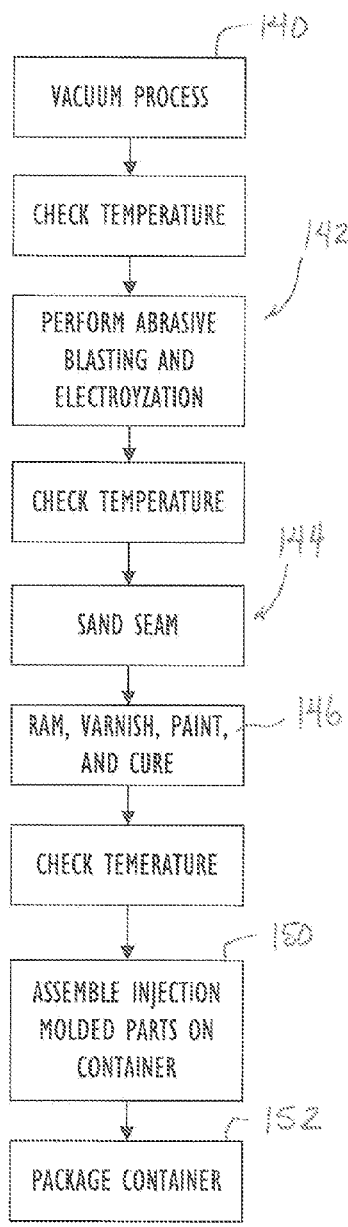
FIG. 5
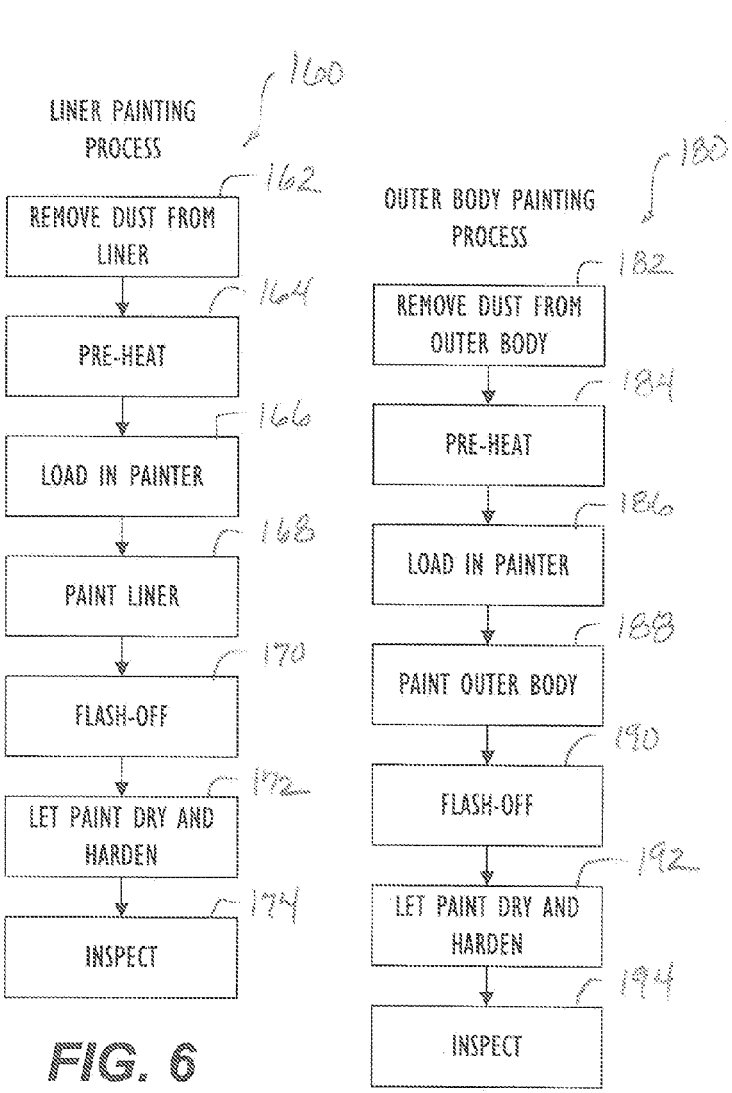
FIG. 6
FIG. 7

DOUBLE-WALLED, VACUUM-INSULATED CONTAINER HAVING INNER COATING CURED AT HIGH TEMPERATURE

BACKGROUND OF THE DISCLOSURE

People use containers for holding beverages or food during every conceivable activity throughout the day, including driving, bike-riding, running, working, etc. In some situations, people want to hold hot or cold beverages or food in these containers. Some of the activities may require the container to be robust and transportable so that some materials are better suited for use than others for a given activity.

For example, ceramic mugs can hold hot beverages, but the mugs do not keep the beverage hot very long. Also, the mugs do not resist impact and are easily broken. As a consequence, ceramic mugs are not easily transportable. Of course, plastic containers can be used, but the drawbacks of plastic are well known. Stainless steel containers are also used to hold beverages, and double-walled, vacuum-insulated stainless steel containers can be used to hold hot and cold beverages or food. When holding hot beverages or food, the stainless steel may impart a metallic taste to the beverage or food and may change its flavor to an extent.

Aluminum bottles can be used to hold beverages. However, the aluminum bottle does not retain heat for use with hot beverages. Also, the aluminum of the bottle can have an odor that negatively impacts the taste of the beverage, especially when hot. To combat the negative taste of the aluminum, aluminum water bottles are available that use an epoxy on the inside of a single-wall aluminum bottle. Unfortunately, the aluminum bottle with epoxy coating cannot keep cold beverages cold and cannot be used for hot beverages (coffee, tea, hot water, etc.) because they will burn the user's hand.

It is recognized that a double-walled, vacuum-insulated container made of stainless steel can have problems when the inside of the container is treated only with electrolysis. It is also recognized that such a container made of metal can have problems when the inside of the container is treated only with an epoxy or resin. For instance, Japanese Patent JP3390349 notes that a fluoro-resin coated on the inside of such a metal container is porous, making the coating easily damaged and stained. Additionally, if the application temperature of the fluororesin (e.g., perfluoroalkoxy copolymer resin (PFA)) is higher than the melting temperature of sealing material that seals an exhaust port for the vacuum formation, then use of the fluororesin is a problem as it becomes impossible to hold the vacuum. Flouroresins can have cure temperatures of as high as 370° C. for PTFE and PFA.

For this reason, it is proposed in Chinese Patent document CN202208422 to Guang Hu et al. to coat the inside of the double-walled, vacuum-insulated container with a ceramic coating with a thickness between 15-60 microns, and preferably 20-30 microns.

As an example of how a ceramic coating is formed on such a container, Japanese Patent document JPH08338 discloses a double-walled, vacuum-insulated container having a film of a ceramic material mixed with antibacterial agent applied to the inside of the container. To form the container, an inner body has the ceramic coating with the antimicrobial agent applied to the inner surface. The coating film is heated for about 20-min. at around 120° C. Aluminum foil is arranged outside the inner body, and an outer body 9 is jointed around the inner body at a seam. A tip pipe on the outer body is used to pull a vacuum in the space between the inner and outer bodies, and the tip pipe is sealed. Finally, a base is attached to the bottom of the outside body to cover the tip pipe.

Another example of coating the inside such a double-walled, vacuum insulated container is disclosed in Japanese Patent document JP3390349, which discloses coating inside the container with porcelain enamel, ceramic, or metal plating. For each of these coatings, manufacture of the container involves coating the inside of the container and then evacuating the space in the container to create the vacuum. Another Japanese Patent document JP2002080075 merely contemplates using a ceramic coating inside the vacuum space of a double-walled container.

As can be seen, a container of suitable material is desired that can be used with hot and cold beverages, food, or the like and can avoid negatively impacting the taste or odor of the contents, while being durable. Conventional wisdom has solved this by applying a coating, such as a ceramic coating, inside a double-walled container and then pulling a vacuum on the container. Although containers manufactured this way may be effective and useful, what is needed is a container that is even more versatile.

The subject matter of the present disclosure is directed to overcoming, or at least reducing the effects of, one or more of the problems set forth above.

SUMMARY OF THE DISCLOSURE

A double-walled, vacuum insulated container is manufactured having a cured inner coating. The container can be used for holding liquid, beverage, food, or other edible contents. The double-walled container is formed having a plenum enclosed between an inner body and an outer body. In one arrangement, the inner body is disposed in the outer body, which can both be formed from stainless steel. The inner body has an inner sidewall, an inner bottom, and an inner lip, and the outer body has an outer sidewall and an outer lip. The inner and outer lips are affixed together. The plenum is then enclosed between the inner body and the outer body by affixing an outer bottom to the outer body.

With the double-walled container formed with the plenum, the manufacturing process creates a vacuum at least partially in the plenum using a seal having a first melt point. The inner coating is then painted/sprayed on an inside surface of the inner body, and the painted coating is cured with a temperature level at least below the first melt point of the vacuum's seal. The paint coating has a drying temperature above a normal drying temperature of a conventional paint coating. Therefore, the temperature level for curing the paint coating is at least above such a normal drying temperature.

To affix the inner and outer lips together, the inner and outer lips can be welded together with an affixation having a second melt point. In this way, curing the painted coating can be performed at a temperature level at least below the first and second melt points.

To create the vacuum in the plenum using the seal having the first melt point, the vacuum can be drawn from the plenum, and a septum, an evacuation port, or the like on the container can be sealed with a first melt point between 450° C. and 500° C. to enclose the vacuum in the plenum. The temperature level for curing the painted coating can be preferably about 300° C. to 320° C. For example, the container with the painted inner coating and drawn vacuum can be passed through a heat tunnel. The temperature level of the heat tunnel can be about 300° C. to 320° C., which is approximately twice a normal drying temperature of 160° C. for the coating.

The foregoing summary is not intended to summarize each potential embodiment or every aspect of the present disclosure.

BRIEF DESCRIPTION OF THE DRAWINGS

FIG. 2 illustrates another of the disclosed containers for holding food or the like.

FIG. 5 illustrates a process for forming a vacuum in the disclosed container and finishing the assembly.

FIG. 6 illustrates a process for painting the inside of the liner of the disclosed container.

FIG. 7 illustrates a process for paining the outside of the outer body of the disclosed container.

DETAILED DESCRIPTION OF THE DISCLOSURE

Figure 1A:
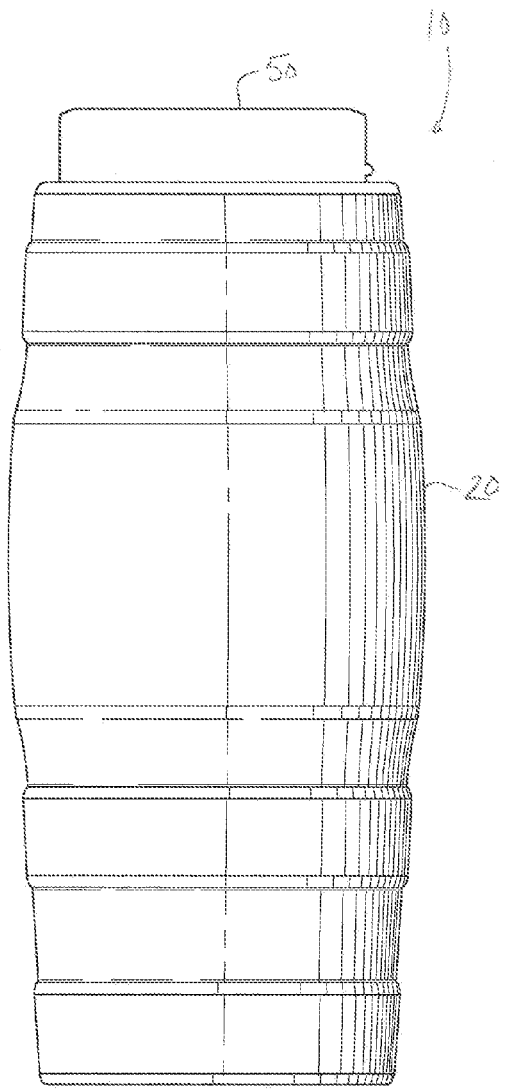
FIG. 1A illustrates an elevational view of a double-walled, vacuum-insulated container having an inner coating according to the present disclosure.
Figure 1B:
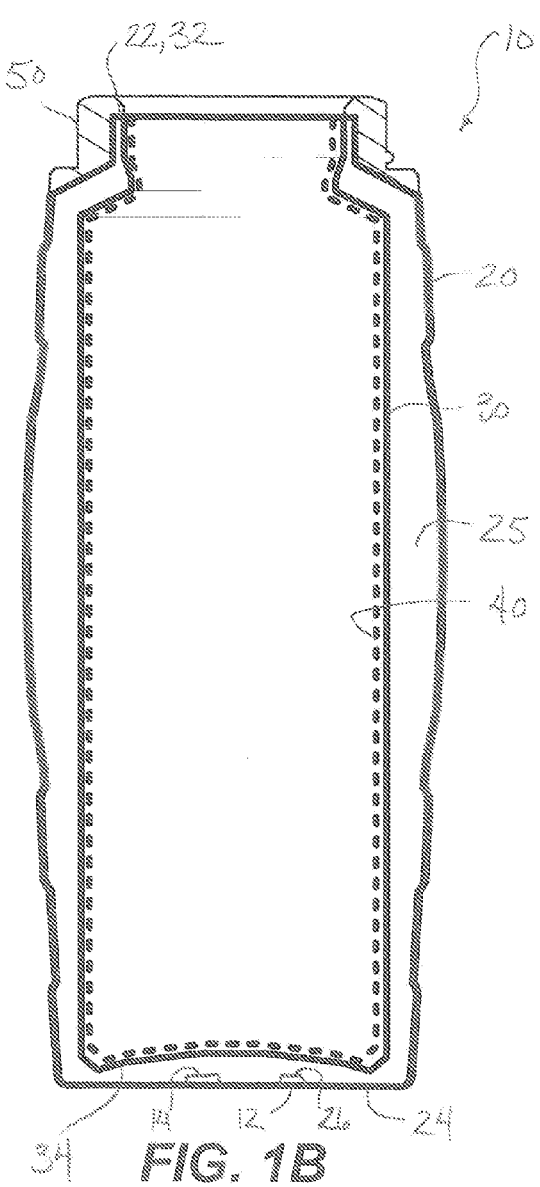
FIG. 1B illustrates a cross-sectional view of the double-walled, vacuum-insulated container having the inner coating.

A double-walled, vacuum-insulated container 10 illustrated in FIGS. 1A-1B includes an outer body 20, an inner body or liner 30, and a ceramic-type paint coating 40. The container 10 may also include other components, such as a molded mouth 50 and even a molded base (not shown) on which to support the container 10. The vacuum-insulated container 10 allows users to take hot or cold liquids, beverages, soup, food, or other edible contents on-the-go, and the paint coating 40 inside the container 10 makes the container 10 relatively tasteless, odorless, and easy to clean. Moreover, the preferred paint coating 40 is painted and cured to be more robust than a mere epoxy or non-stick type of surface applied inside a container.

FIG. 1A illustrates an elevational view of the dual-walled, vacuum-insulated container 10 according to the present disclosure. The container 10 can be used for various types of hot and cold beverages. The main construction of the container 10 is preferably stainless steel, although other metal materials can be used. Certain components, such as a mouth 50 of the container 10 and any lid (not shown) may be composed of different materials, such as injected molded plastic or the like. For its part, the lid can thread onto the mouth 50 of the container 10, may sealably insert into the mouth 50, or may affix by other known methods. The container 10 may also include a molded support of plastic or rubber disposed on the container's bottom end.

As shown in a cross-sectional view of FIG. 1B, the double-walled, vacuum-insulated container 10 has the outer body 20 with the inner liner 30 disposed therein. The inner liner 30 is separated on all sides from the sidewall of the outer body 20, and primarily only the upper lip 32 of the liner 30 is affixed (e.g., welded, brazed, etc.) to the lip 22 of the outer body 20. Even the bases 24 and 34 of the outer body 20 and liner 30 are preferably separate from one another. The plenum 25 between the outer body 20 and the liner 30 can be a vacuum (or at least partial vacuum) to provide insulation between the contents to be held in the liner 30 from the environment outside the outer body 20.

Molded components, such as the mouth 50, may be affixed at the top of the container 10 where the lips 22, 32 affix together. Inside, the liner 30 has the paint coating 40 applied thereto so that the metal material (e.g., stainless steel) of the liner 30 does not contact the contained liquid, beverage, food, etc. directly. This coating 40 is preferably a ceramic-type coating and preferably a paint that simulates ceramic, as will be described in more detail below.

Figure 1C:
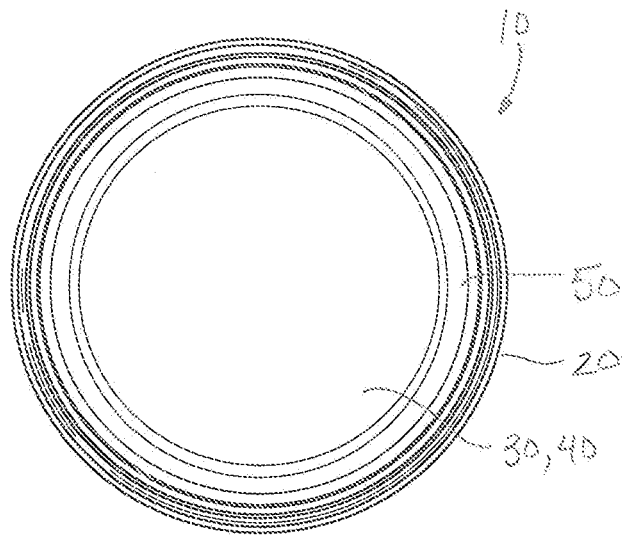
FIGS. 1C-1D illustrate top and bottom views of the double-walled, vacuum-insulated container having an inner coating.
Figure 1D:
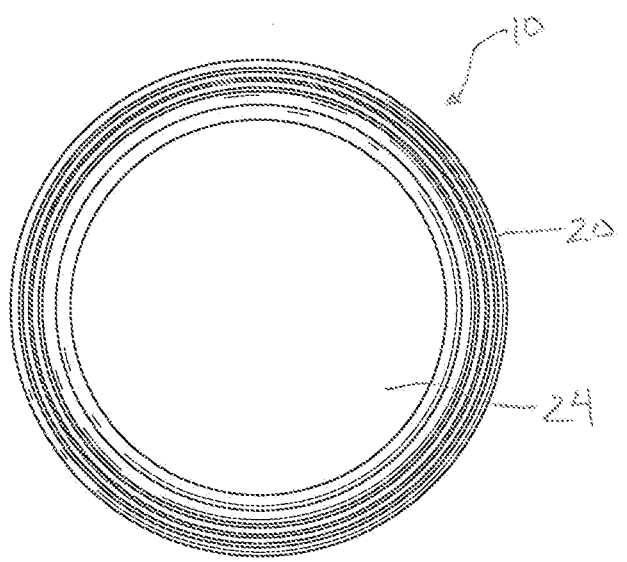

FIGS. 1C-1D illustrate top and bottom views of the double-walled, vacuum-insulated container 10 having the inner coating 40. The top view of FIG. 1C shows the molded components of the mouth 50 around the top of the container 10 and shows the inside surface of the liner 30 having the inner coating 40. The bottom view of FIG. 1D shows the base 24 of the container's outer body 20.

Figure 2:
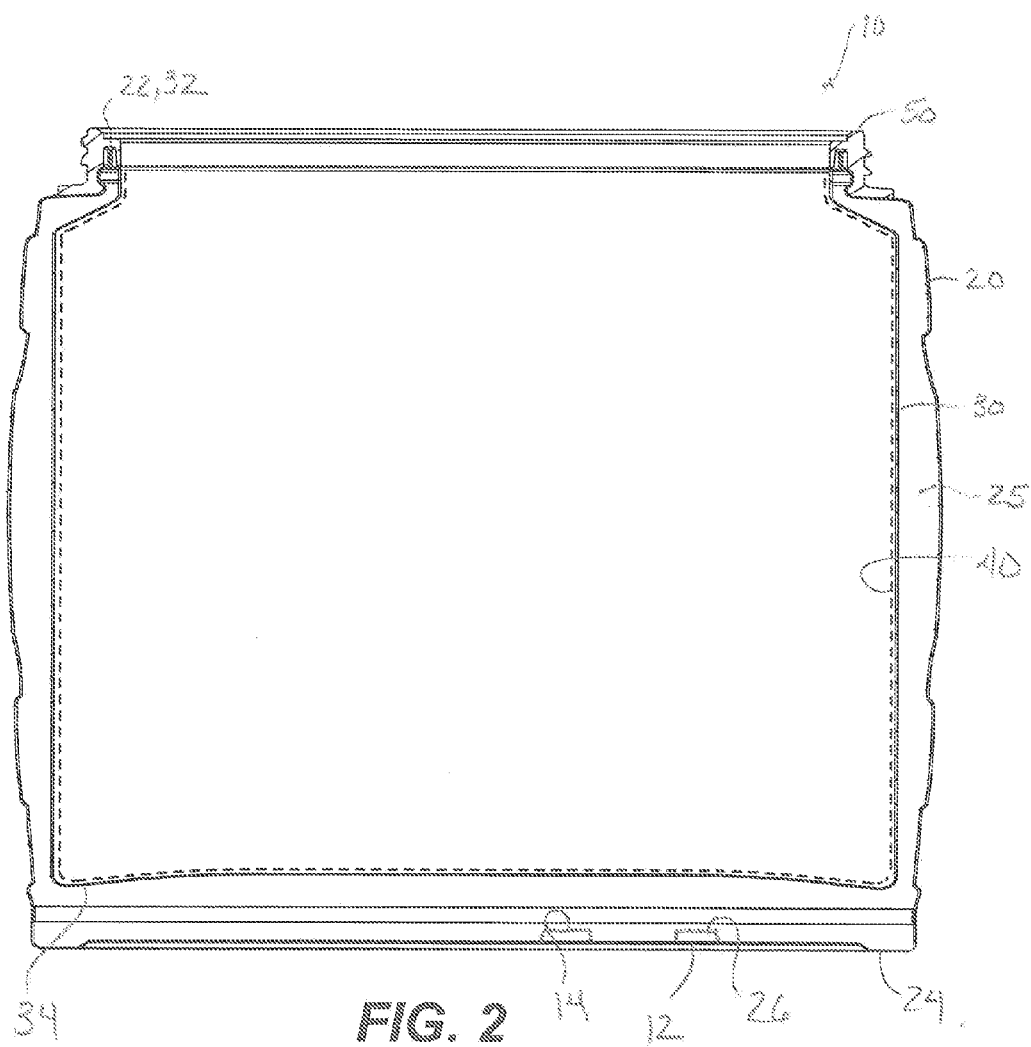

As an alternative to the narrower container 10 of FIGS. 1A-1D for holding a beverage, the container 10 can have different shapes and sizes to hold edible contents. For example, FIG. 2 shows another container 10 for holding food or the like. Many of the features of this container 10 are similar to those discussed previously so that the same reference numerals are used. As can be further seen in FIG. 2, the container 10 may include a molded base 12.

Figure 3:
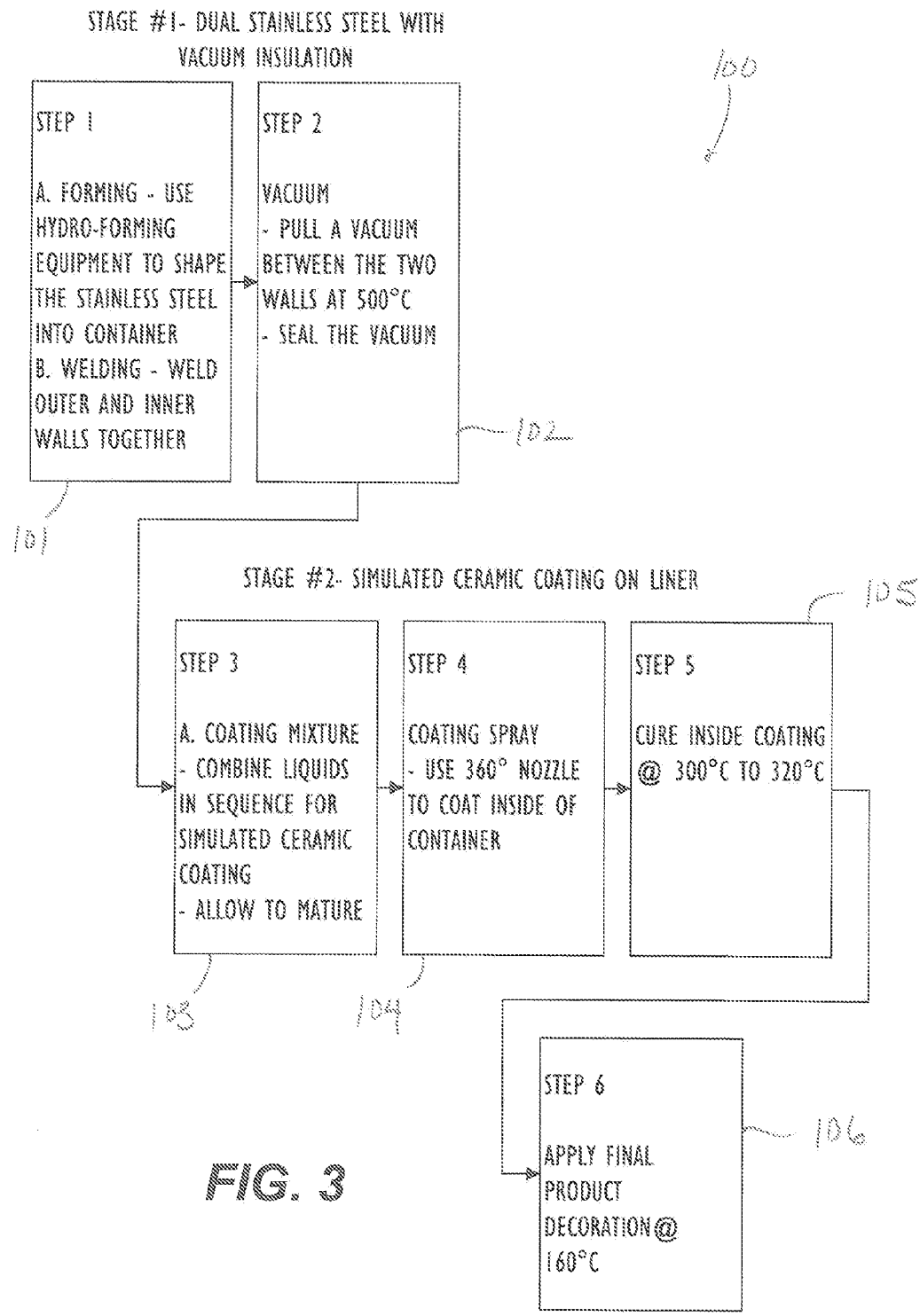
FIG. 3 illustrates a process for forming the double-walled, vacuum-insulated container having the inner coating.

Forming the disclosed container 10 requires combining two incompatible types of technologies. The container 10 is first formed with vacuum insulation between the two walls of the stainless steel liner 30 and outer body 20 and is then coated with a sprayed coating 40 on the inside of the liner 30. Both of these processes require temperatures for welding, drying, curing, etc. that can interfere with one another. To that end, a process 100 as shown in FIG. 3 is used for forming the double-walled, vacuum-insulated container 10 having the inner coating 40.

Combining the vacuum formation and coating process has a number of difficulties not readily apparent. In particular, it has been found that drying a painted paint coating having a normal drying temperature on a double-walled, vacuum-insulated container does not produce desired results. As an example, a normal drying temperature for a conventional paint coating is about 160° C. and may even be between 170° C. and 180° C. However, a drying temperature for the ceramic-type paint coating 40 used on the insulated container 10 of the present disclosure is approximately twice that normal drying temperature or at about 300 to 320° C. The paint coating 40 applied inside the liner 30 of the double-walled, vacuum-insulated container 10 and cured at an elevated temperature produces a durable, abrasive-resistant, and uniform surface for use with hot and cold beverages and food.

In other difficulties, structural melt points of the container 10 (especially for the seal that keeps the vacuum inside the dual-wall container 10 and less for the structural welds that hold the container 100 together) may be exceeded in the coating and drying process. If this occurs, the vacuum is lost, causing the product to fail. For these reasons, the process 100 of forming the container 10 preferably has two stages as shown in FIG. 3. However, instead of coating the container in the way conventional wisdom dictates, the disclosed process 100 of forming the container 10 produces a cured inner coating 40 on the container 10 of preferred quality.

In a first stage of the process, the double-walled, vacuum-insulated container 10 is formed with the vacuum insulation. In a first step 101, the components of the container 10 are formed using hydro-forming equipment to shape the container's components. Then, welding is performed to weld the outer and inner walled components of the container 10 together. The melt point for the welds may be quite elevated and may even be about 3100° C. In a second step 102, the vacuum is pulled on the plenum 25 between the walls of the container 10. Pulling the vacuum is done in a furnace at an elevated temperature of about 500° C. Getter materials can be used to absorb remaining gases.

Once the vacuum is at least partially formed inside the walls of the container 10, the vacuum is sealed using sealing techniques. For example and as depicted in FIGS. 1B and 2, a cap, seal, or plug 12 can be formed or applied to an evacuation port 26 or the like on the outer body 20 to enclose the vacuum in the plenum 25. In a particular implementation, a brazing material can be disposed next to an evacuation port 26 on the outer body 20 and can seal the evacuation port 26 when the brazing material is melted and then hardened as the seal 12 after the vacuum has been drawn. Alternatively, the port 26 may include a tube, septum, or tail on the outer body 20, which can be closed or pinched off in a seal to enclose the vacuum in the plenum 25. In some cases, the tube may be composed of copper welded to the evacuation port 26 on the container 10 so the vacuum can be pulled from the plenum 25. Once the vacuum is at least partially created, portion of the tube can be cut and then sealed to enclose the vacuum in the evacuated plenum 25. These and other vacuum sealing techniques can be used.

With the container 10 formed with vacuum insulation, the process moves onto the second stage in which the paint coating 40 is applied inside the container 10. In a third step 103 of the process 100, the components of the coating's mixture are combined. In general, the coating can be composed of suitable ceramic-type coating components—e.g., a polymer composite with insulating ceramics, a water-based nano-coating in ceramic, an aluminum oxide ceramic coating, a solvent-based silicone coating, or others. Preferably, a suitable ceramic-type coating includes Water Ceramic Paint available from Shenzhen Hongshi Chemicals, Ltd of China. In general, this coating is a water-based ceramic paint and includes three liquid components, which are combined together in a particular sequence and allowed to mature to produce the paint coating 40 for spraying on the liner 30.

In a fourth step 104, the paint coating 40 is sprayed on the inside of the container's liner 30. A 360° nozzle can be used to coat the inside of the container's liner 30 uniformly. In a fifth step 105, the coating 40 is cured or dried at an elevated temperature, such as 300° C. to 320° C. This drying temperature and process cannot interfere with the welds used to form the container 10 or with the seal used to seal the vacuum of the container 10. Overall, the paint coating 40 may have a thickness of about 0.015 to 0.06 mm.

As can be seen, coating and curing the coating 40 on the liner 30 after drawing and sealing the vacuum is preferred because the process of drawing and sealing the vacuum may require temperatures and operations that can damage any pre-applied coating 40. In a final sixth step 106, final product decorations can be applied to the container 10 when at a particular temperature, such as 160° C. These final decorations may include application of exterior paint on the outside of the container 10, addition of molded plastic components to the container 10, etc.

With an understanding of the overall process 100 for forming the disclosed container 10, particular details of the various steps are discussed below with reference to FIGS. 4 through 7.

Figure 4:
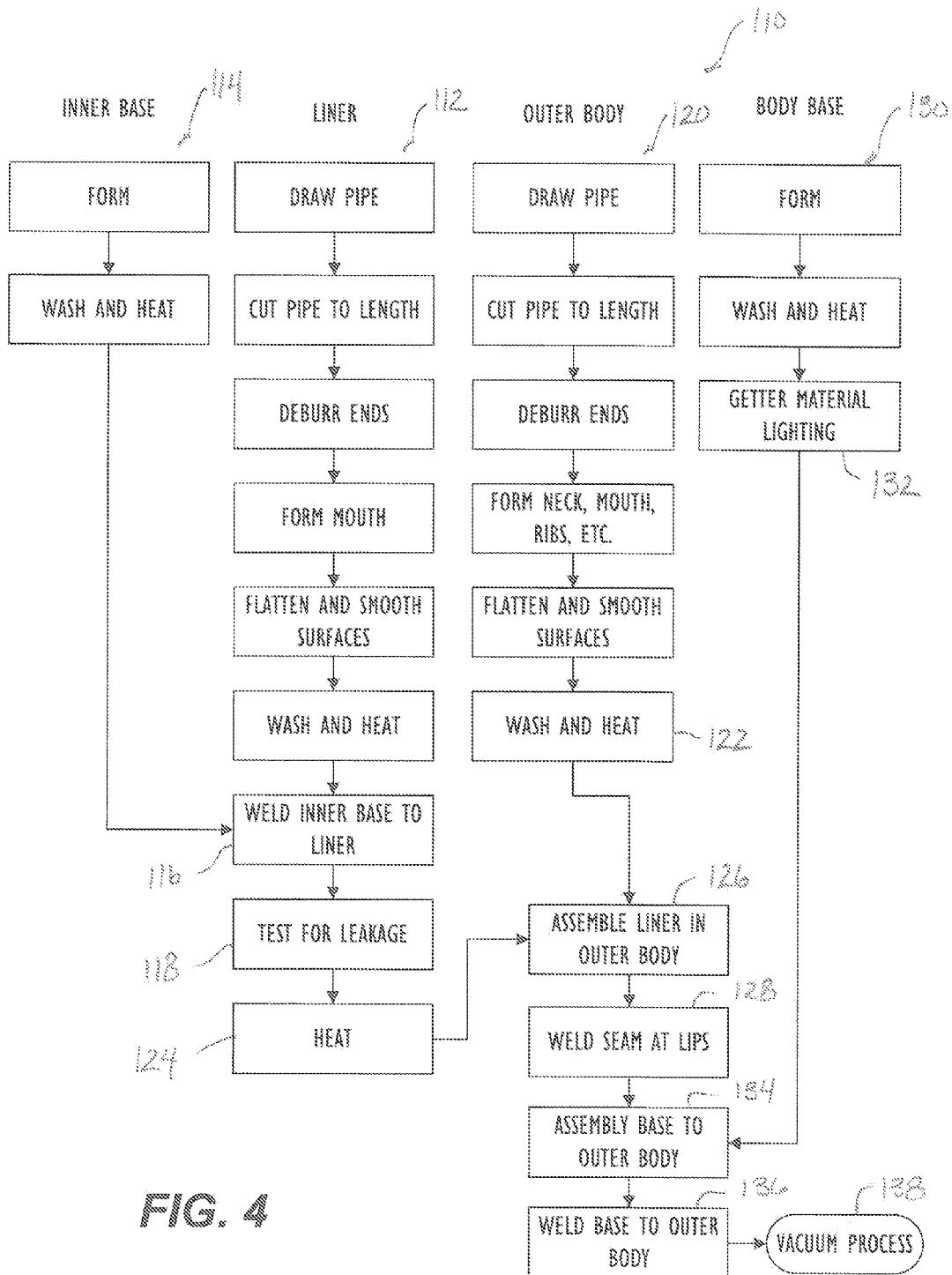
FIG. 4 illustrates a process for forming and assembling a liner, inner base, outer body, and body base for the disclosed container.

Turning first to FIG. 4, a process 110 is shown for assembling the disclosed container 10 from a liner 30, an inner base 32, an outer body 20, and a body base 24. These various components are formed using hydro-forming or other metal forming techniques. For example, the liner 30 and outer body 20 are cylindrical tubes or pieces that can be formed by hydroforming. Stamping two cylindrical halves and welding them together could be used as an alternative manufacturing step. As is known, hydro-forming is a die molding process that uses pressurized fluid to form the metal pieces. Due to the cylindrical nature of the container 10, tube hydroforming is used to expand raw metal tubes or pipes into a shape using two die halves. To hydro-form the liner 30 and body 20, the raw tube component can be loaded into hydroforming dies, which is then closed. Sealing rods engage and seal the ends of the raw tube component. Fluid pressure is increased inside the tube component, and the sealing rods push the tube into the die as the internal pressure is ramped up. In the end, the tube component takes on the shape of the surrounding die.

The inner base 34 and the body base 24 are generally flat components for affixing to open ends of the liner 30 and outer body 20 respectively, and they can be formed by stamping, hydroforming, or other process.

In Blocks 112, the liner 30 is formed by drawing the raw, stainless steel pipe and cutting it to length. Ends of the cut pipe are deburred, and the lip 32 is formed on one end using hydroforming. Overall, the surface of the cut pipe is flattened and smoothed, and the prepared piece is washed and heated.

In Blocks 114, the inner base 34 is formed by stamping or the like, and the base 34 is washed and heated. At Block 116, the heated inner base 34 and the liner piece 30 are then assembled with the inner base 34 disposed at the opposite open end to the liner's lip 32. The inner base 34 is then welded to the liner 30 to form a closed body with only the lip 32 being open. The liner 30 is then tested for leakage to ensure proper welding and the like (Block 118).

In Blocks 120, the outer body 20 is formed in a fashion similar to the liner 30. The outer body 20 is formed by drawing the raw, stainless steel pipe and cutting it to length. Ends of the cut pipe are deburred. The outer body 20 may have additional shapes and counters so neck, mouth, lip, ribs, and other features are formed on the outer body 20 using hydroforming. Overall, the surface of the body 20 is flattened and smoothed, and the prepared body piece 20 is washed.

With the liner 30 and outer body piece 20 formed, the components are heated (Blocks 122 & 124), and the liner 30 is assembled inside the outer body piece 20 (Block 126). The seams at the lips 22 and 32 of the liner 30 and outer body piece 20 are then welded so that the liner 30 fits primarily suspended inside the outer body piece 20 (Block 128). The melt point for this weld at the lips 22 and 32 may be quite high and may even be about 3100° C.

In Blocks 130, the body base 24 is formed by stamping or the like, and the base 24 is washed and heated. A getter material (14: FIGS. 1B and 2) can then be used in assembling the container 10 and can be applied as appropriate to one or more components, such as base 24 (Block 132). The getter material 14 can react with residual gas in the container's plenum 25 when the vacuum is formed. The body base 24 is then assembled on the outer body piece 20 with the base 24 disposed at the opposite open end to the body's neck and lip 22 (Block 134). The base 24 is then welded to the body 20 to enclose the liner 30 inside the container 10 (Block 136).

At this point, a vacuum process is used to form a vacuum at least partially inside the plenum 25 of the outer body 20 and liner 30 (Block 138). Understanding the weld melt points for the various welds used is helpful in later stages of manufacture so the future vacuum in the container 10 is not lost, for example, when curing the coating 40 inside the liner 30.

After the raw container 10 having the liner 30 and the body 20 has been formed, final assembly steps in FIG. 5 are performed to form the vacuum in the container 10, prepare and coat the container's surfaces, and ultimately package the container 10. As shown in FIG. 5, a vacuum process 140 forms the vacuum in the plenum 25 of the container 10. A number of vacuum processes can be used. As noted previously, some of the processes for forming the vacuum may use a septum or evacuation port 26 and may then require a seal 12 to be made over the septum or port 26 to hold the vacuum in the container 10. The melt point temperature of the seal 12 over the septum or port 26 is preferably between 450° C. and 500° C. As can be seen in this case, not only are the melt points of the welds need to be understood, but the melt point of the vacuum seal 12 needs to be known so the vacuum seal is not damage during subsequent coating and drying processes to apply the ceramic-type coating 40 described later.

The assembly process of FIG. 5 then continues with additional steps. During the assembly process of FIG. 5, the temperature of the container 10 is checked multiple times to ensure it is not overheated or damaged. After forming the vacuum (Block 140) and checking the temperature, abrasive blasting and electrolyzing are performed (Block 142). Another temperature check is made, and the seam of the container 10 is sanded (Block 144). The container 10 is then rammed, varnished, painted, and cured, as the case may be (Block 146). A final temperature check can be made, and then injection molded parts (e.g., mouth 50) can be assembled on the container 10 (Block 150). Finally, the container 10 can be packaged (Block 152).

Because the disclosed container 10 has the inner coating 40 applied inside the liner 30, the coating 40 is preferably applied after the vacuum is pulled so that the coating 40 is not harmed during any vacuum forming process. All the same, the coating process cannot interfere with the assembly welds, vacuum seals, and the like used in forming the disclosed container 10.

To that end, FIG. 6 illustrates a process 160 for painting the inside of the liner 30 in the disclosed container 10 with the coating 40. Dust is removed from the liner 30 (Block 162), and the container 10 is pre-heated to a temperature between 40° C. and 100° C. for between 4 to 10 minutes (Block 164). The container 10 is loaded into the painter machine, and the paint head coats the inside surface of the liner 30 (Blocks 166-168). The spray printing gun can use multi-nozzles providing a 360° spray area to apply the coating 40 inside the liner 30. One particular spray printing gun is available from Taiwan Prona Industries Co., Ltd.

Painting is followed by a flash-off period of 1 to 3 minutes, and the paint coating 40 is allowed to dry and harden (Blocks 170-172). The drying process can use temperatures at 300° C. to 320° C. for 30 to 35 minutes, and the spray printing line can use a high temperature drying tunnel at about 300° C. to 320° C., which is about twice the normal drying temperature of a conventional paint coating. Finally, the paint coating 40 of the liner 30 can be inspected (Block 174).

FIG. 7 illustrates a process 180 for paining the outside of the body 20 on the disclosed container 10. Dust is removed from the outer body 20 (Block 182), and the container is pre-heated to a temperature between 50° C. and 100° C. for between 4 to 10 minutes (Block 184). The container 10 is loaded into the painter machine, and the outside surface of the body 20 is painted (Blocks 186-188). Painting is followed by a flash-off period of 3 to 5 minutes, and the paint is then allowed to dry and harden (Blocks 190-192). The drying process can use temperatures at 140° C. to 150° C. for 30 to 40 minutes. Finally, the painting on the outer body 20 can be inspected (Block 194).

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A container manufacturing method, comprising:
    forming a double-walled container having a plenum enclosed between an inner body and an outer body;
    creating a vacuum at least partially in the plenum using a seal having a first melt point;
    applying a paint coating to an inside surface of the inner body after creating the vacuum, the paint coating having a drying temperature above a normal drying temperature of a conventional paint coating; and
    curing the paint coating with a temperature level, the temperature level being above the normal drying temperature of the conventional paint coating and being below the first melt point.

2. The method of claim 1, wherein the inner body and the outer body comprise a stainless steel material.

3. The method of claim 1, wherein forming the double-walled container having the plenum enclosed between the inner body and the outer body comprises:
    disposing the inner body in the outer body, the inner body having an inner sidewall, an inner bottom, and an inner lip, the outer body having an outer sidewall and an outer lip;
    affixing the inner and outer lips together with an affixation having a second melt point; and
    enclosing the plenum between the inner body and the outer body by affixing an outer bottom to the outer body.

4. The method of claim 3, comprising initially forming the inner body by affixing the inner bottom to an end of the inner sidewall.

5. The method of claim 4, wherein affixing the inner bottom to the end of the inner sidewall comprises welding the inner bottom to the inner sidewall.

6. The method of claim 3, wherein affixing the inner and outer lips together with the affixation having the second melt point comprises welding the inner and outer lips together.

7. The method of claim 3, wherein affixing the outer bottom to the outer body comprises welding the outer bottom to the outer body.

8. The method of claim 3, wherein curing the paint coating comprises curing the paint coating with the temperature level at least below the second melt point, wherein the second melt point is at least 500° C.

9. The method of claim 1, wherein creating the vacuum in the plenum using the seal having the first melt point comprises drawing the vacuum from the plenum and sealing an evacuation port with the seal.

10. The method of claim 1, wherein the first melt point is between 450° C. and 500° C. and the temperature level is 300° C. to 320° C.

11. The method of claim 1, wherein curing the paint coating with the temperature level comprises passing the container through a heat tunnel at the temperature level approximately twice the normal drying temperature for the conventional paint coating, wherein the normal drying temperature for the conventional paint coating is about 160° C.

12. The method of claim 1, wherein applying the paint coating to the inside surface of the inner liner comprises spraying the paint coating as a water-based ceramic paint onto the inside surface.

13. A double-walled, vacuum-insulated container manufactured according to the method of claim 1.

14. A container manufacturing method, comprising:
   disposing an inner body in an outer body;
   affixing inner and outer lips of the inner and outer bodies together with an affixation having a first melt point;
   enclosing a plenum between the inner body and the outer body;
   creating a vacuum at least partially in the plenum using a seal having a second melt point;
   applying a paint coating to an inside surface of the inner body after creating the vacuum, the paint coating having a drying temperature above a normal drying temperature of a conventional paint coating; and
   curing the paint coating with a temperature level, the temperature level being above the normal drying temperature of the conventional paint coating and being below the first and second melt points.

15. The method of claim 14, wherein curing the paint coating comprises curing the paint coating with the temperature level at least below the first melt point, wherein the first melt point is at least 500° C.

16. The method of claim 14, wherein the second melt point is between 450° C. and 500° C. and the temperature level is 300° C. to 320° C.

17. The method of claim 14, wherein curing the paint coating with the temperature level comprises passing the container through a heat tunnel at the temperature level approximately twice the normal drying temperature for the conventional paint coating, wherein the normal drying temperature for the conventional paint coating is about 160° C.

18. The method of claim 14, wherein applying the paint coating to the inside surface of the inner liner comprises spraying the paint coating as a water-based ceramic paint onto the inside surface.

* * * * *